(12) United States Patent
Gan et al.

(10) Patent No.: US 6,912,143 B2
(45) Date of Patent: Jun. 28, 2005

(54) SYNCHRONOUS RECTIFIER WITH BURST MODE CONTROL

(75) Inventors: Hong-Jian Gan, Taoyuan Hsien (TW); Yao-Jian Huang, Taoyuan Hsien (TW); Yi Chen, Taoyuan Hsien (TW); Alpha J. Zhang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 74 days.

(21) Appl. No.: 10/632,541

(22) Filed: Jul. 30, 2003

(65) Prior Publication Data

US 2004/0109335 A1 Jun. 10, 2004

(30) Foreign Application Priority Data

Jul. 30, 2002 (TW) ........................................ 91117084 A

(51) Int. Cl.[7] ............................................. H02M 7/217
(52) U.S. Cl. ........................................ 363/89; 363/127
(58) Field of Search .............................. 363/81, 82, 84, 363/89, 125, 127

(56) References Cited

U.S. PATENT DOCUMENTS

| | | | | |
|---|---|---|---|---|
| 5,179,512 A | * | 1/1993 | Fisher et al. | ................. 363/127 |
| 5,453,923 A | * | 9/1995 | Scalais et al. | ................. 363/53 |
| 5,663,874 A | * | 9/1997 | Mader et al. | ............. 363/21.14 |
| 5,734,563 A | * | 3/1998 | Shinada | .................... 363/21.06 |
| 5,870,299 A | * | 2/1999 | Rozman | ..................... 363/127 |
| 6,169,683 B1 | * | 1/2001 | Farrington | ................... 363/127 |
| 6,307,356 B1 | * | 10/2001 | Dwelley | ...................... 323/282 |
| RE37,510 E | * | 1/2002 | Bowman et al. | ............... 363/15 |
| 6,426,884 B1 | * | 7/2002 | Sun | .............................. 363/17 |
| 6,452,818 B1 | * | 9/2002 | Simopoulos | ............. 363/21.06 |
| 6,563,719 B1 | * | 5/2003 | Hua et al. | ................. 363/21.06 |
| 6,618,274 B2 | * | 9/2003 | Boylan et al. | ................. 363/17 |
| 2002/0044470 A1 | * | 4/2002 | Hua | ........................... 363/127 |
| 2002/0067624 A1 | * | 6/2002 | Nishiyama et al. | ....... 363/21.01 |
| 2003/0174525 A1 | * | 9/2003 | Ingman et al. | ................. 363/90 |

* cited by examiner

*Primary Examiner*—Adolf Berhane

(57) ABSTRACT

The present invention proposes a synchronous rectifier with burst mode control. A synchronous rectifier includes a transformer having a primary winding electrically connected to a power source, a secondary winding, a first auxiliary winding, and a second auxiliary winding, a first switch and a second switch electrically connected to the secondary winding and control terminals of the first switch and the second switch individually connected to the first and second auxiliary windings for being either self-driven directly from voltages of the auxiliary windings, a third switch electrically connected between the first switch and the first auxiliary winding in series, a fourth switch electrically connected between the second switch and the second auxiliary winding in series, a detecting circuit electrically connected to an output terminal of the synchronous rectifier for detecting a load status, and a control circuit electrically connected to the detecting circuit for enabling the third switch and the fourth switch when the load status is at a heavy load and disabling the third switch and the fourth switch when the load status is at a light load.

20 Claims, 5 Drawing Sheets

SYNCHRONOUS RECTIFIER WITH BURST MODE CONTROL

FIELD OF THE INVENTION

This invention generally relates to a synchronous rectifier with burst mode control, and more particularly to the synchronous rectifier utilizing burst mode control to force a transistor to be turned off at light loads, so as to reduce the power dissipation.

BACKGROUND OF THE INVENTION

In the present power supplies, a synchronous rectifier as they are commonly known utilizes a transformer to drive the transistors of the synchronous rectifier so as to obtain an effective filtering and rectifying conversion of the AC input signal. However, the conventional synchronous rectifier utilizes diodes to be a rectifier. Furthermore, it is difficult to apply a synchronous rectifier which is composed of diodes to a low voltage power supply because the forward voltage drop of the diodes generates more than 50% power dissipation. Therefore, a high efficiency and low voltage power supply generally utilizes MOSFETs instead of diodes in order to reduce the power dissipation of the forward voltage drop of the diodes.

Please refer to FIG. 1. It is a schematic diagram of MOSFETs used as a synchronous rectifier according to the prior art. As shown in FIG. 1, the synchronous rectifier 10 includes a transformer 11, two MOSFETs 12, 13, a filtering inductor 14, and a filtering capacitor 15. The transformer 11 also includes a primary winding 111, two secondary windings 112, 113, and two auxiliary windings 114, 115. Two auxiliary windings 114, 115 are utilized to forward-biase the MOSFET 12, 13.

The drawback of the conventional method is that the efficiency of the synchronous rectifier will be reduced and the conduction loss of the MOSFETs will be increased when the synchronous rectifier operates at light load and the operation of the synchronous rectifier at light load is the same to that at heavy load.

It is therefore attempted by the applicant to deal with the above situation encountered with the prior art.

SUMMARY OF THE INVENTION

It is therefore an object of the present invention to propose a synchronous rectifier with burst mode control to force the transistors to be turned of at a light load so as to decrease power dissipation.

It is therefore another object of the present invention to propose a burst mode control method which uses the technique of cycle-skipping to reduce switching losses of the synchronous rectifier.

To achieve the foregoing object, and in accordance with the invention as embodied and broadly described herein, the present invention provides a synchronous rectifier including a transformer, a first switch, a second switch, a third switch, a fourth switch, a detecting circuit, and a control circuit. The transformer has a primary winding electrically connected to a power source, a secondary winding, a first auxiliary winding, and a second auxiliary winding. The first switch and the second switch are electrically connected to the secondary winding. Control terminals of the first switch and the second switch are individually connected to the first and second auxiliary windings for being either self-driven directly from voltages of the auxiliary windings. The third switch is electrically connected between the first switch and the first auxiliary winding in series. The fourth switch is electrically connected between the second switch and the second auxiliary winding in series. The detecting circuit is electrically connected to an output terminal of the synchronous rectifier for detecting a load status. And, the control circuit is electrically connected to the detecting circuit for enabling the third switch and the fourth switch when the load status is at a heavy load and disabling the third switch and the fourth switch when the load status is at a light load.

Preferably, a drain terminal of the first switch is electrically connected to a first terminal of the transformer. A source terminal of the first switch is electrically connected to a source terminal of the second switch. A drain terminal of the second switch is electrically connected to a second terminal of the transformer.

Preferably, one terminal of the first auxiliary winding is electrically connected to one terminal of the third switch, and the other terminal of the first auxiliary winding is electrically connected to a source terminal of the first switch.

Preferably, one terminal of the second auxiliary winding is electrically connected to one terminal of the fourth switch, and the other terminal of the second auxiliary winding is electrically connected to a source terminal of the second switch.

Preferably, the transformer has a center-tapped winding. A center-tap of the transformer is connected to a terminal of a filtering inductor. The other terminal of the filtering inductor is electrically connected to a terminal of a filtering capacitor. The other terminal of the filtering capacitor is electrically connected to the source terminal of the first switch. And, the terminals of the filtering capacitor are output terminals of the synchronous rectifier.

Preferably, the first switch further includes a body diode.

Preferably, the second switch further includes a body diode.

Preferably, the first switch further includes a Schottky diode.

Preferably, the second switch further includes a Schottky diode.

Preferably, the first switch, the second switch, the third switch, and the fourth switch are MOSFETs.

Preferably, the synchronous rectifier further includes a DC/DC controller IC and a switching circuit electrically connected to the primary winding of the transformer for entering and exiting burst mode when the load status is at a light load, and the third and the fourth switches are disabled.

According another aspect of the present invention, a burst mode control method is provided. The burst mode control method is applied to a synchronous rectifier including a transformer having a primary winding electrically connected to a power source, a secondary winding, a first auxiliary winding, and a second auxiliary winding, a first switch and a second switch electrically connected to the secondary winding and control terminals of the first switch and the second switch individually connected to the first and second auxiliary windings for being either self-driven directly from voltages of the auxiliary windings, a third switch electrically connected between the first switch and the first auxiliary winding in series, and a fourth switch electrically connected between the second switch and the second auxiliary winding in series. The burst mode control method includes the steps of detecting a load status of an output terminal of the synchronous rectifier, and enabling the third switch and the fourth switch when the load status is at a heavy load and disabling the third switch and the fourth switch when the load status is at a light load.

The present invention may best be understood through the following description with reference to the accompanying drawings, in which:

DETAILED DESCRIPTION OF THE PREFERRED EMBODIMENT

Although this invention is susceptible to embodiments of many different forms, a preferred embodiment will be described and illustrated in detail herein. The present disclosure exemplifies the principle of the invention and is not being considered a limitation to the broader aspects of the invention to the particular embodiment as described.

Figure 1:
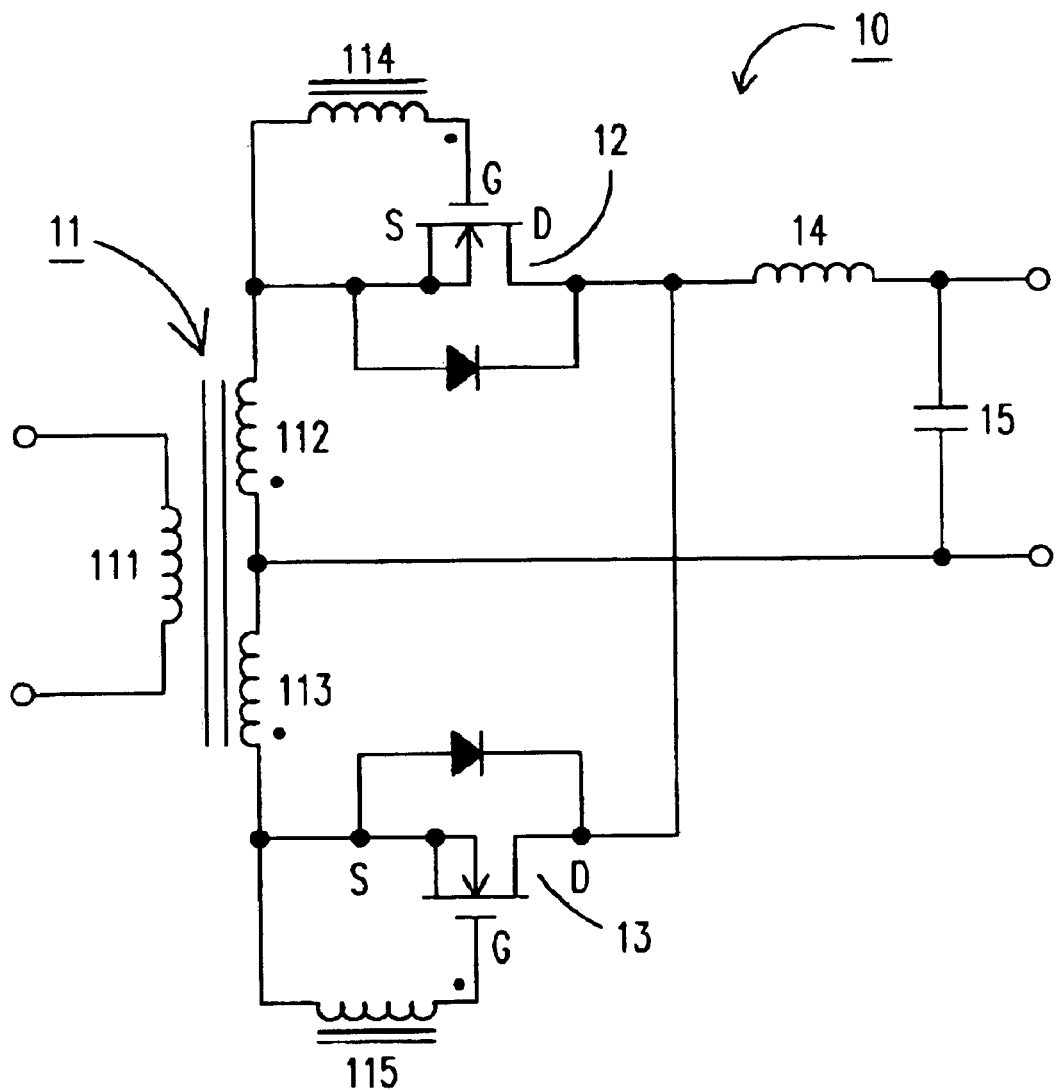
FIG. 1 is a schematic diagram of MOSFETs used as a synchronous rectifier according to the prior art.
Figure 2:
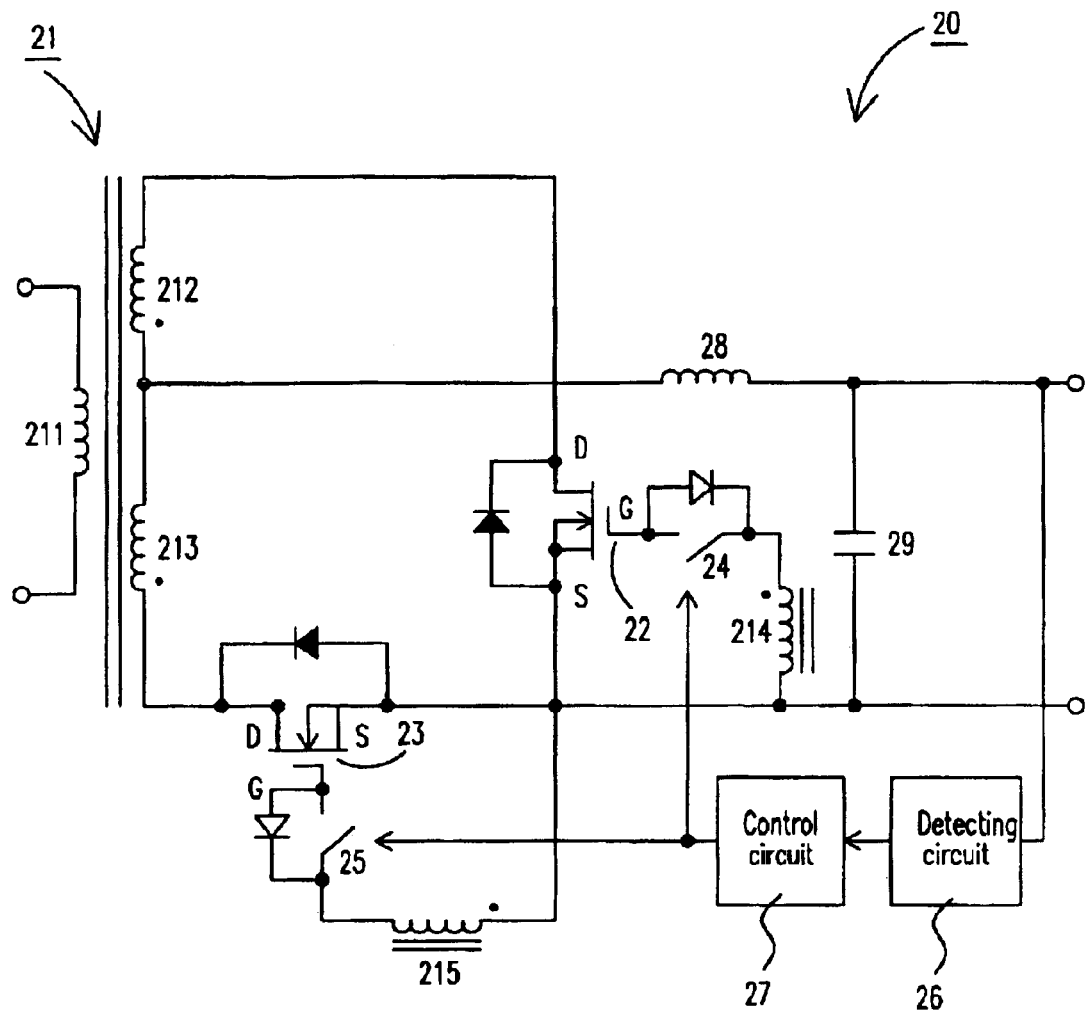
FIG. 2 is a block diagram of a first preferred embodiment according to the present invention.

Referring to FIG. 2, it is a block diagram of a first preferred embodiment according to the present invention. In this topology, a synchronous rectifier 20 includes a transformer 21, a first switch 22, a second switch 23, a third switch 24, a fourth switch 25, a detecting circuit 26, a control circuit 27, a filtering inductor 28, and a filtering capacitor 29. The transformer 21 has a primary winding 211 electrically connected to a power source, a secondary winding 212, 213, a first auxiliary winding 213, and a second auxiliary winding 214. The first switch 22 and the second switch 23 are electrically connected to the secondary windings 212, 213. Control terminals of the first switch 22 and the second switch 23 are individually connected to the first and second auxiliary windings 214, 215 for being either self-driven directly from voltages of the auxiliary windings 214, 215. The third switch 214 is electrically connected between the first switch 22 and the first auxiliary winding 214 in series. The fourth switch 25 is electrically connected between the second switch 23 and the second auxiliary winding 215 in series. The detecting circuit 26 is electrically connected to an output terminal of the synchronous rectifier 20 for detecting a load status. Furthermore, the control circuit 27 is electrically connected to the detecting circuit 26 for enabling the third switch 24 and the fourth switch 25 when the load status is at a heavy load and disabling the third switch 24 and the fourth switch 25 when the load status is at a light load.

The detailed description of the circuit is described as follows. A drain terminal of the first switch 22 is electrically connected to a first terminal of the transformer 21. A source terminal of the first switch 21 is electrically connected to a source terminal of the second switch 23. A drain terminal of the second switch 23 is electrically connected to a second terminal of the transformer 21. One terminal of the first auxiliary winding 214 is electrically connected to one terminal of the third switch 24. The other terminal of the first auxiliary winding 214 is electrically connected to a source terminal of the first switch 24. One terminal of the second auxiliary winding 215 is electrically connected to one terminal of the fourth switch 25, and the other terminal of the second auxiliary winding 215 is electrically connected to a source terminal of the second switch 23. The transformer 21 has a center-tapped winding. A center-tap of the transformer 21 is connected to a terminal of a filtering inductor 28. The other terminal of the filtering inductor 28 is electrically connected to a terminal of a filtering capacitor 29. The other terminal of the filtering capacitor 29 is electrically connected to the source terminal of the first switch 22. The terminals of the filtering capacitor 29 are output terminals of the synchronous rectifier 20.

As shown in FIG. 2, the first switch 22 and the second switch 23 further includes a body diode individually. However, the body diode also can be a Schottky diode. The first switch 22, the second switch 23, the third switch 24, and the fourth switch 25 can be MOSFETs.

The working principle of the synchronous rectifier 20 is described as follows. The load status can be detected by the magnitude of the output current to generate a load status signal when the detecting circuit 26 detects the output current of the synchronous rectifier 20. The load status signal can be used to enable the control circuit 27. The control circuit 27 enables the third switch 24 and the fourth switch 25 when the load status is at a heavy load. The synchronous rectifier 20 operates under normal operation. The control circuit 27 disenables the third switch 24 and the fourth switch 25 to reduce the power loss when the load status is at a light load.

Figure 3:
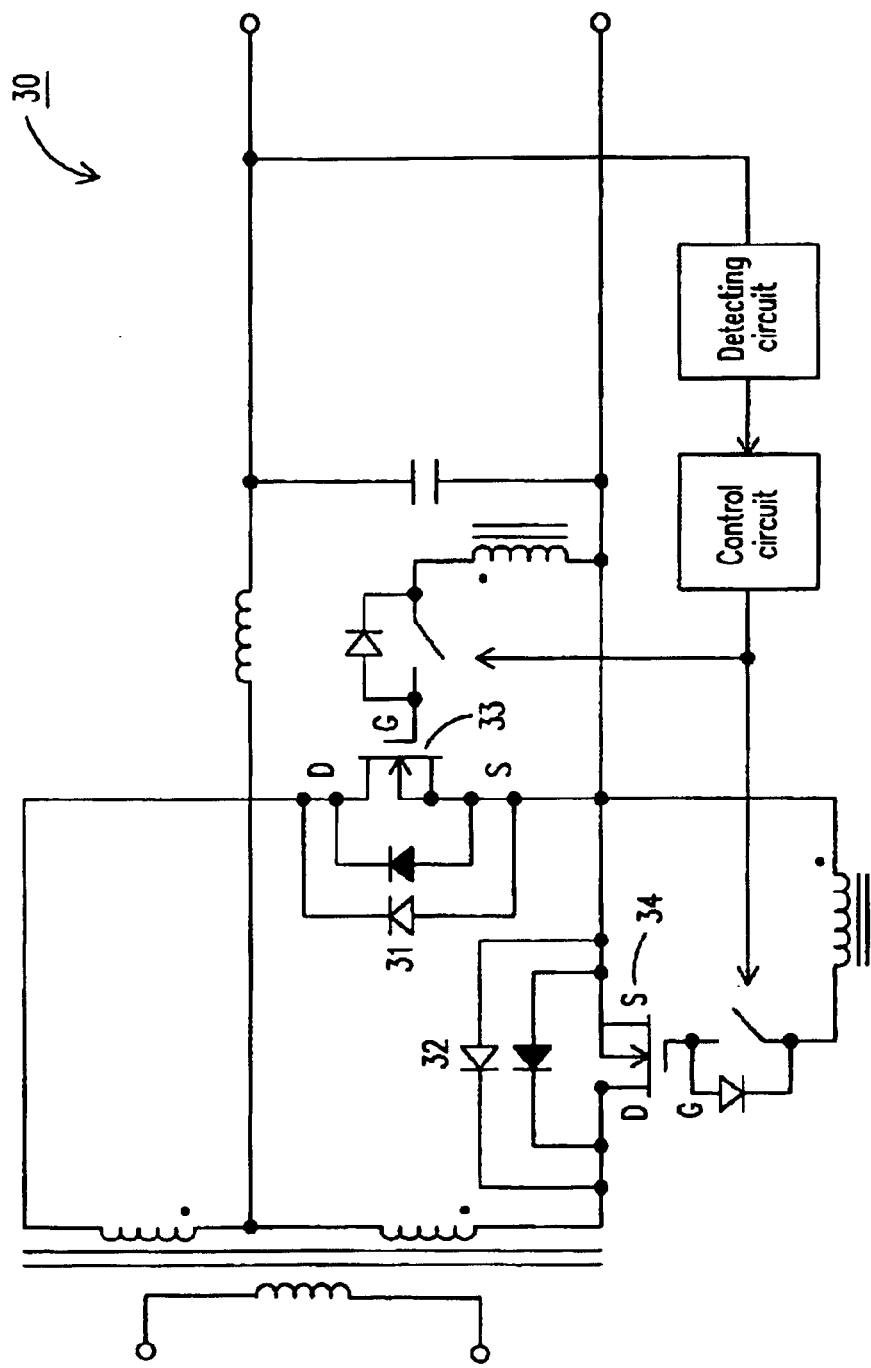
FIG. 3 is a block diagram of a second preferred embodiment according to the present invention.

Please refer to FIG. 3. It is a block diagram of a second preferred embodiment according to the present invention. As shown in FIG. 3, the difference between FIG. 3 and FIG. 4 is that the synchronous rectifier 30 further includes two Schottky diodes.

Figure 4:
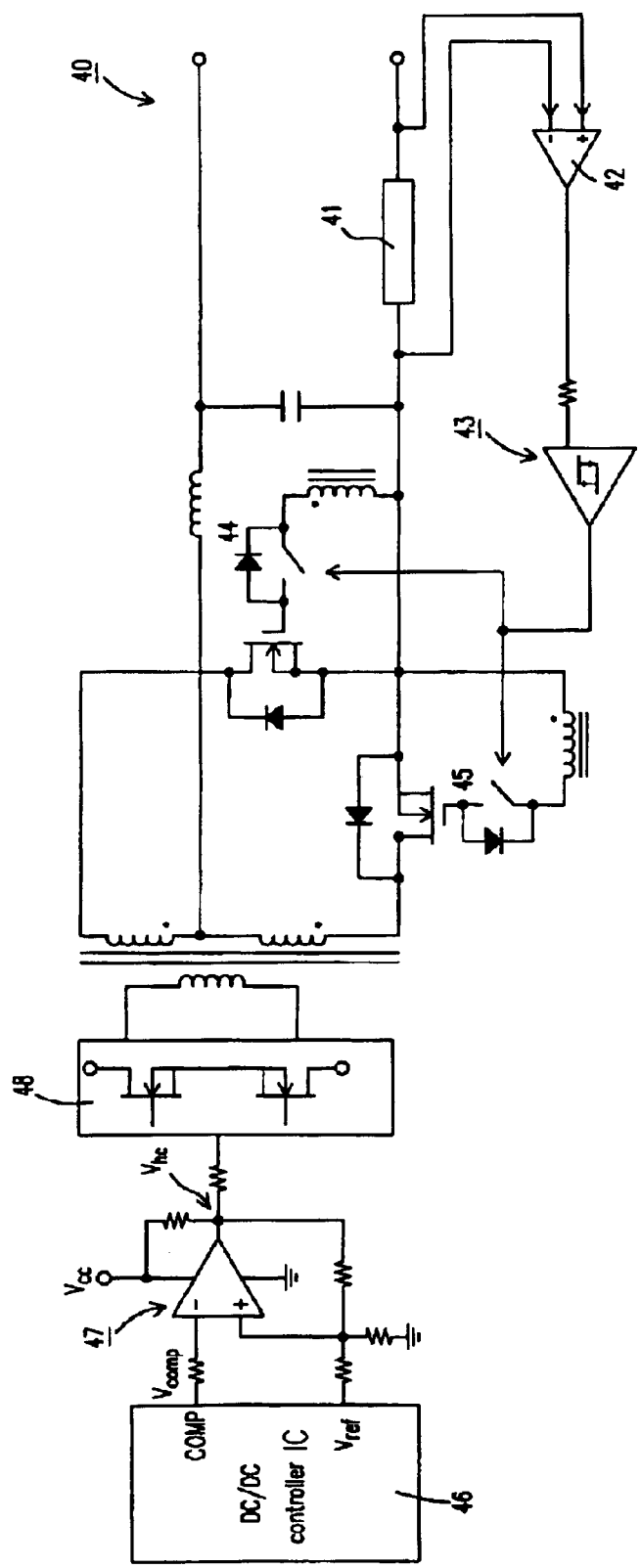
FIG. 4 is a schematic diagram of a preferred embodiment according to the present invention.

Please refer to FIG. 4. It is a schematic diagram of a preferred embodiment according to the present invention. The working principle of the synchronous rectifier 40 at a light load is described as follows.

According to the voltage drop of the impedance 41, a first voltage signal is generated. The first voltage signal is transferred by a comparator 42 to generate a second voltage signal. The second voltage signal is delivered from the output terminal of the comparator 42 to the hysteretic comparator 43. The hysteretic comparator 43 outputs a low voltage signal to enable the third switch 44 and the fourth switch 45 when the second voltage signal is greater than a predetermined value. The hysteretic comparator 43 outputs a high voltage signal to disable the third switch 44 and the fourth switch 45 when the second voltage signal is lower than a predetermined value.

The synchronous rectifier further includes a DC/DC controller IC 46 and a switching circuit 47 electrically connected to the primary winding of the transformer for entering and exiting burst mode when the load status is at a light load, and the third and the fourth switches 44, 45 are disabled. Meanwhile, the voltage signal $V_{COMP}$ of the DC/DC controller IC 46 is proportional to the output voltage and the output current of the synchronous rectifier 40. The voltage signal $V_{COMP}$ is delivered to the hysteretic comparator 47. The hysteretic comparator 47 outputs a low voltage signal to enable the switching circuit 48 and enter the burst mode to control the synchronous rectifier 40 when the voltage signal $V_{COMP}$ is larger than a first predetermined value $V_H$. The hysteretic comparator 47 outputs a high voltage signal to disable the switching circuit 48 when the voltage signal $V_{COMP}$ is lower than a second predetermined value $V_L$.

The working principle of the burst mode control is described as follows. Under light mode operation the third switch and the fourth switch are disabled and then the voltage signal $V_{COMP}$ gradually increases to the first predetermined value $V_H$ to enable the switching circuit 48 and enter the burst mode control of the synchronous rectifier 40. Furthermore, the voltage signal $V_{COMP}$ gradually decreases to the second predetermined value $V_L$ to disable the switching circuit 48 when the switching circuit 48 is disabled. Therefore, the synchronous rectifier 40 can be controlled by the burst mode under the light load operation to reduce the power loss.

Figure 5:
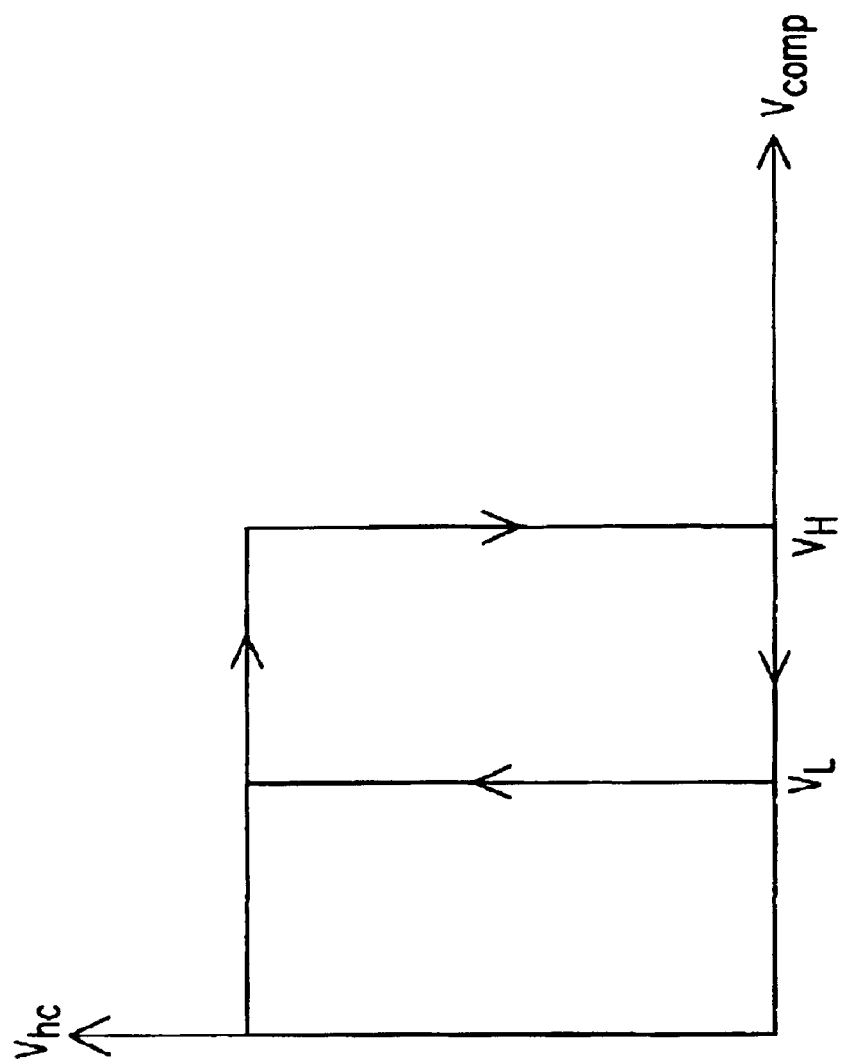
FIG. 5 is a characteristic diagram of a hysteretic comparator of a preferred embodiment according to the present invention.

Please refer to FIG. 5. It is a characteristic diagram of a hysteretic comparator of a preferred embodiment according to the present invention. Meanwhile, $V_{hc}$ represents the output voltage of the hysteretic comparator 43.

Consequently the present invention proposes a synchronous rectifier with burst mode control. Especially the synchronous rectifier utilizes burst mode control to force a transistor to be turned off under a light load operation, so as to reduce the power dissipation.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A synchronous rectifier, comprising:
   a transformer having a primary winding electrically connected to a power source, a secondary winding, a first auxiliary winding, and a second auxiliary winding;
   a first switch and a second switch electrically connected to said secondary winding and control terminals of said first switch and said second switch individually connected to said first and second auxiliary windings for being either self-driven directly from voltages of said auxiliary windings;
   a third switch electrically connected between said first switch and said first auxiliary winding in series;
   a fourth switch electrically connected between said second switch and said second auxiliary winding in series;
   a detecting circuit electrically connected to an output terminal of said synchronous rectifier for detecting a load status; and
   a control circuit electrically connected to said detecting circuit for enabling said third switch and said fourth switch when said load status is at a heavy load and disabling said third switch and said fourth switch when said load status is at a light load.

2. The synchronous rectifier according to claim 1, wherein a drain terminal of said first switch is electrically connected to a first terminal of said transformer, a source terminal of said first switch is electrically connected to a source terminal of said second switch, and a drain terminal of said second switch is electrically connected to a second terminal of said transformer.

3. The synchronous rectifier according to claim 2, wherein one terminal of said first auxiliary winding is electrically connected to one terminal of said third switch, and the other terminal of said first auxiliary winding is electrically connected to a source terminal of said first switch.

4. The synchronous rectifier according to claim 3, wherein one terminal of said second auxiliary winding is electrically connected to one terminal of said fourth switch, and the other terminal of said second auxiliary winding is electrically connected to a source terminal of said second switch.

5. The synchronous rectifier according to claim 4, wherein said transformer has a center-tapped winding, a center-tap of said transformer is connected to a terminal of a filtering inductor, the other terminal of said filtering inductor is electrically connected to a terminal of a filtering capacitor, the other terminal of said filtering capacitor is electrically connected to said source terminal of said first switch, and said terminals of said filtering capacitor are output terminals of said synchronous rectifier.

6. The synchronous rectifier according to claim 1, wherein said first switch further comprises a body diode.

7. The synchronous rectifier according to claim 1, wherein said second switch further comprises a body diode.

8. The synchronous rectifier according to claim 1, wherein said first switch further comprises a Schottky diode.

9. The synchronous rectifier according to claim 1, wherein said second switch further comprises a Schottky diode.

10. The synchronous rectifier according to claim 1, wherein said first switch, said second switch, said third switch, and said fourth switch are MOSFETs.

11. The synchronous rectifier according to claim 1 further comprises a DC/DC controller IC and a switching circuit electrically connected to said primary winding of said transformer for entering and exiting burst mode when said load status is at a light load, and said third and said fourth switches are disabled.

12. A burst mode control method applied to a synchronous rectifier comprising a transformer having a primary winding electrically connected to a power source, a secondary winding, a first auxiliary winding, and a second auxiliary winding, a first switch and a second switch electrically connected to said secondary winding and control terminals of said first switch and said second switch individually connected to said first and second auxiliary windings for being either self-driven directly from voltages of said auxiliary windings, a third switch electrically connected between said first switch and said first auxiliary winding in series, and a fourth switch electrically connected between said second switch and said second auxiliary winding in series, comprising the steps of:

detecting a load status of an output terminal of said synchronous rectifier; and enabling said third switch and said fourth switch when said load status is at a heavy load and disabling said third switch and said fourth switch when said load status is at a light load.

13. The burst mode control method according to claim 12, wherein a drain terminal of said first switch is electrically connected to a first terminal of said transformer, a source terminal of said first switch is electrically connected to a source terminal of said second switch, and a drain terminal of said second switch is electrically connected to a second terminal of said transformer.

14. The synchronous rectifier according to claim 13, wherein one terminal of said first auxiliary winding is electrically connected to one terminal of said third switch, and the other terminal of said first auxiliary winding is electrically connected to a source terminal of said first switch.

15. The synchronous rectifier according to claim 14, wherein one terminal o f said second auxiliary winding is electrically connected to one terminal of said fourth switch, and the other terminal of said second auxiliary winding is electrically connected to a source terminal of said second switch.

16. The synchronous rectifier according to claim 15, wherein said transformer has a center-tapped winding, a center-tap of said transformer is connected to a terminal of a filtering inductor, the other terminal of said filtering inductor is electrically connected to a terminal of a filtering capacitor, the other terminal of said filtering capacitor is electrically connected to said source terminal of said first switch, and said terminals of said filtering capacitor are output terminals of said synchronous rectifier.

17. The synchronous rectifier according to claim 12, wherein said first switch and said second switch further comprise a body diode individually.

18. The synchronous rectifier according to claim 12, wherein said first switch further and said second switch comprise a Schottky diode individually.

19. The synchronous rectifier according to claim 12, wherein said first switch, said second switch, said third switch, and said fourth switch are MOSFETs.

20. The synchronous rectifier according to claim 12 further comprises a DC/DC controller IC and a switching circuit electrically connected to said primary winding of said transformer for entering and exiting burst mode when said load status is at a light load, and said third and said fourth switches are disabled.

\* \* \* \* \*